United States Patent
Melanson et al.

(10) Patent No.: US 8,271,164 B2
(45) Date of Patent: Sep. 18, 2012

(54) GUIDANCE SYSTEM FOR AN AGRICULTURAL IMPLEMENT

(75) Inventors: Barry K. Melanson, Kennedy (CA); Bruce W. Wilton, Langbank (CA); David R. Duke, Langbank (CA); Ross L. Filpula, Kipling (CA); Patrick M. Beaujot, Langbank (CA)

(73) Assignee: One Pass Implements Inc., Langbank (CA)

( * ) Notice: Subject to any disclaimer, the term of this patent is extended or adjusted under 35 U.S.C. 154(b) by 555 days.

(21) Appl. No.: 11/877,583

(22) Filed: Oct. 23, 2007

(65) Prior Publication Data

US 2009/0101371 A1  Apr. 23, 2009

(51) Int. Cl.
*G06F 7/70* (2006.01)

(52) U.S. Cl. .............. 701/50; 111/14; 111/52; 111/903; 111/923; 111/924; 56/208; 172/26; 172/278; 172/282; 172/283; 280/412; 280/413; 280/474

(58) Field of Classification Search .............. 701/50; 111/903, 923, 924; 56/208; 172/26, 283, 172/282; 280/412, 413, 474
See application file for complete search history.

(56) References Cited

U.S. PATENT DOCUMENTS

| 3,886,718 | A | * | 6/1975 | Talbot | 56/208 |
|---|---|---|---|---|---|
| 4,100,862 | A | | 7/1978 | Mowen et al. | |
| 4,244,306 | A | | 1/1981 | Peterson et al. | |
| 4,616,712 | A | | 10/1986 | Jorgensen | |
| 4,624,197 | A | | 11/1986 | Drake | |
| 4,821,807 | A | | 4/1989 | Trumm | |
| 4,930,581 | A | * | 6/1990 | Fleischer et al. | 172/6 |
| 5,088,561 | A | | 2/1992 | Jurgens | |
| 5,156,219 | A | | 10/1992 | Schmidt et al. | |
| 5,181,572 | A | | 1/1993 | Andersen et al. | |
| 5,240,079 | A | * | 8/1993 | Schmidt | 172/6 |
| 5,255,756 | A | | 10/1993 | Follmer et al. | |
| 5,476,147 | A | | 12/1995 | Fixemer | |
| 5,709,271 | A | * | 1/1998 | Bassett | 172/4 |
| 6,553,925 | B1 | * | 4/2003 | Beaujot | 111/14 |
| 2005/0028504 | A1 | * | 2/2005 | Gramm | 56/208 |

FOREIGN PATENT DOCUMENTS

DE  4004247 A1  8/1991
DE  4102487 A1  3/1992

* cited by examiner

*Primary Examiner* — Redhwan k Mawari
(74) *Attorney, Agent, or Firm* — Bennett Jones LLP (57) ABSTRACT

The invention provides a guidance system for guiding a towed agricultural implement such as seeders, planters, sprayers and the like, along a preferred path between rows of growing crop or standing stubble by sensing the rows of growing crop or standing stubble with a uniquely designed paddle-like sensor means which does not engage the ground.

12 Claims, 7 Drawing Sheets

FIG. 4b

GUIDANCE SYSTEM FOR AN AGRICULTURAL IMPLEMENT

FIELD OF THE INVENTION

The present invention relates to a guidance system for guiding a towed agricultural implement such as seeders, planters, sprayers and the like, along a preferred path. More particularly, the present invention relates to a guidance system that senses rows of growing crops or previous crop stubble with a uniquely designed paddle-like sensor.

BACKGROUND OF THE INVENTION

No-till farming practices, also known as conservation tillage or zero tillage, have become common for both row crops and solid seeded crops. No-till farming allows for the growing of crops from year to year without disturbing the soil through tillage. In no-till farming, the soil is left intact and crop residue and standing stubble from the previous year's crop are left to aid in moisture retention, to prevent soil erosion, etc.

In no-till farming it is often desirable to guide seeders, planters, sprayers and the like that are being towed by a work vehicle such as a tractor between the rows standing stubble of the previous year crop. For example, when seeding, it is desirable to plant the seeds between the rows of standing stubble. Thus, specialized equipment has been developed to ensure seeding between rows of standing stubble (see, for example, U.S. Pat. Nos. 4,624,197, 4,616,712 and 6,553, 925). As pointed out in U.S. Pat. No. 4,624,197, the advantages of seeding between previous years stubble rows in a no-till cropping system is that it reduces clogging or build up of trash from the previous crop, and reduces wind and water erosion by leaving the old stubble standing.

Many different devices have been used for sensing the stubble or growing plants to send a signal to the towing hitch, allowing it to move left or right so that the towed implement follows the desired path. Ground engaging sensors, such as disclosed in U.S. Pat. Nos. 6,553,925 and 4,616,712, sense the furrows or base of the plant stalks. Other sensors, such as wand sensors as disclosed by U.S. Pat. Nos. 4,930,581, 5,156, 219 and 4,821,807 sense the side of the plants or stalks without engaging the ground. However, there are drawbacks with both ground engaging sensors and wand sensors.

There are also times where it is desirable to guide an agricultural implement towed by a work vehicle between rows of growing crops. For example, a guidance system may be beneficial when towing a cultivator to remove weeds, etc. growing between rows of growing crops. Thus, it is important that the cultivator tools are towed through the field of field such that the tools do not engage the crop.

There are several problems that may arise when using ground engaging sensors, in particular in no-till farming. For example, the furrows left by the previous year's seeding operation are often distorted by the weather, i.e., the rains filling them in, or traffic on the field from harvest equipment or spraying equipment. Thus, if the ground engaging sensor is designed to sense the furrows, an uneven furrow may give false readings. Also, ground engaging sensors can be affected stones, clumps of dirt or lumps of straw left by harvesters, etc. so the sensors riding on the ground often give false readings. Thus, often it is necessary to implement a second sensor to give the operator an option as to which sensor is working properly because stubble rows have been trampled by previous field operations (see, for example, U.S. Pat. No. 6,553, 925).

Ground engaging sensors are more complex and expensive than a sensor that only engages the crop, as they need to be able to follow the contours of the ground and to be lifted into and out of transport position. They are also subject to damage from rocks and wear. Another disadvantage of ground engaging sensors is that with narrow row spacing cereal crops, it is often desirable to harrow the field after harvest to further spread and break up straw left by the harvesters in order to provide a better seed bed when seeding into wet spring conditions. However, such a harrowing operation fills in the furrows, hence, furrow sensors would not work in a harrowed field.

There are also several problems associated with using wand sensors in no-till conditions. Wand sensors are most often used in growing crops where damage to the plants is a concern. Each of the wand sensors shown in U.S. Pat. Nos. 4,930,581, 5,156,219 and 4,821,807 are wishbone shaped whereby the outer edges are rods designed to engage the crop plants or the previous crop stalks. However, for example, in no-till cereal stubble, the stalks are often 6 to 14 inches high, the row width generally about 2 to 6 inches wide and the space between the rows of stalks generally about 6 to 12 inches. Thus, if the wand gets caught in the middle of the row instead of between the rows it will have a tendency to stay there instead of moving to the desired position between the rows.

Another drawback associated with many of the row sensor devices taught in the prior art arises when these devices are used in narrow row spacing small grains such as Wheat, Barley, or Canola stubble. Because of the narrow row spacing there is potential for the sensor device to get off track for several reasons; rows are knocked down from previous operations, areas of the stubble is lodged and flat on the ground or the moving hitch has moved as far as it can in one direction and cannot go any further. It would be desirable for a sensor device to also provide the operator with the ability to reset the device by centering the towed implement relative to the towing vehicle and starting the guidance system over again.

Thus, it is desirable to have a sensor device that is generally not affected by the contour of the ground or debris on the ground such as stones, straw, etc. and that generally does not get caught in the middle of the stubble row.

SUMMARY OF THE INVENTION

In one aspect of the present invention, a guidance system for positioning an agricultural implement having a hitch and towed by a work vehicle on a preferred path for operating between rows of growing crops or standing stalks or stubble, said hitch being pivotally attached to the distal end of a hitch plate and the work vehicle being pivotally attached to the proximal end of the hitch plate, comprising:

(a) a paddle-like sensor means having a right edge and a left edge operably mounted on the implement such that the sensor means does not engage the ground;

(b) a sensing means for sensing when a force is being applied to one of the right edge or left edge of the sensor by one or the other of the rows and producing a corresponding signal; and (c) means for receiving the signal and for effecting the lateral rotation of the hitch plate thereby laterally moving the towed implement either to the right or left relative to the work vehicle so that the force is no longer being applied to either the right edge or left edge of the sensor means.

The present guidance system is particularly useful in guiding a seeder between rows of standing stalks of stubble left in a field during no-till farming. However, it is understood that the guidance system could be used to guide any towed implement such as a cultivator, fertilizing implement, etc. between rows of either standing stubble or growing crops rows.

Preferably, the width of the sensor means at its widest point is only slightly narrower than the gap between the rows of standing stalks or growing crops that are being sensed.

In one embodiment, the paddle-like sensor means is a substantially solid paddle being narrower at the front end and wider at the back end, the width at the back end being slightly narrower than the gap between the crops or stalks that are being sensed. In another embodiment, a portion of the back end of the paddle-like sensor means is essentially concave such that in the event that the sensor begins to ride on top of a row of crops or stalks, a force will be applied to the right or left sloped surface of the concave portion of the sensor. The sensing means can also sense this force being applied to either sloped surface and will produce a corresponding signal. The signal receiving means will receive the signal and effect the lateral rotation of the hitch plate. Thus, the lateral rotation of the hitch plate will laterally move the towed implement either to the right or left relative to the work vehicle so that the force is no longer being applied to either the right or left sloped surface of the sensor means. Thus, the concave back end of the paddle-like sensor means will reduce the chances and the length of time the sensor means tends to stay on top of the row. The paddle-like sensor means is preferably made from a durable resin such as a plastic resin, a light-weight metal or other durable materials known in the art.

In operation, the paddle-like sensor means is preferably positioned about 3 to about 12 inches above the ground so that the sensor does not encounter obstacles on the ground. Of course, it is understood that the position of the sensor will depend on a number of factors such as the type of growing crop; the height of the growing crop or standing stubble; the condition of the soil, i.e., how rocky the soil is, and the like. By having the sensor means work above the ground level and only engage the standing stalks crop, the farmer can conduct field operations after harvest and prior to seeding such as spraying or harrowing without causing a negative affect on the sensor's ability to operate properly.

When the guidance system is first put into operation, i.e., switched on, the sensor means is preferably positioned between the rows of crops or stalks such that neither the right or left edge is touching either row. However, if either the right or left edge of the paddle-like sensor means engages the growing crops or standing stalks, this will cause a slight lateral movement of the sensor means, which in turn will activate the sensing means to produce a corresponding signal.

In one embodiment, the sensing means comprises a pair of steering sensor switches, which produce an electrical signal corresponding to the force applied to the sensor means. The electrical signal then activates or opens at least one electric over hydraulic solenoid valve. The activated hydraulic solenoid valve in turn causes the release of hydraulic fluid to at least one hydraulic cylinder operably connected at one end to the hitch plate and at the other end to the hitch of the towed implement, thereby causing the hitch plate to laterally rotate either to the left or the right which in turn causes the towed implement to move laterally either to the right or left and reposition the sensor means back into the middle of the gap between the rows of crops or stalks.

In one embodiment, a double acting hydraulic solenoid valve and a double acting hydraulic cylinder are used. In another embodiment, a pair of hydraulic solenoid valves and a pair of corresponding hydraulic cylinders are used.

In another aspect of the present invention, the guidance system further comprises a centering system which provides the operator with the option of centering the towed implement relative to the towing vehicle by temporarily overriding the guidance system. This may be desirable in situations where the sensor means is no longer sensing the rows of crops or stubble, for example, when the sensor means encounters trampled or lodged crop or a patch of weeds, when the sensor means is riding on top of a row, when the operator first starts the farming operation or when starting a new row of seeding, etc. In these circumstances it may be desirable to turn off the guidance system and turn on the centering system to center the towed implement relative to the towing vehicle so that the towed implement and towing vehicle are now aligned. The operator can then position the sensor means of the guidance system between the rows again and re-engage the guidance system. Thus, the centering system operates to realign the towed implement prior to engaging the guidance system.

BRIEF DESCRIPTION OF THE DRAWINGS

The features and advantages of the invention will become more apparent from the following detailed description of the embodiment with reference to the attached diagrams wherein.

DESCRIPTION OF THE PREFERRED EMBODIMENT

The detailed description set forth below in connection with the appended drawings is intended as a description of various embodiments of the present invention and is not intended to represent the only embodiments contemplated by the inventors. The detailed description includes specific details for the purpose of providing a comprehensive understanding of the present invention. However, it will be apparent to those skilled in the art that the present invention may be practiced without these specific details.

Figure 1A:
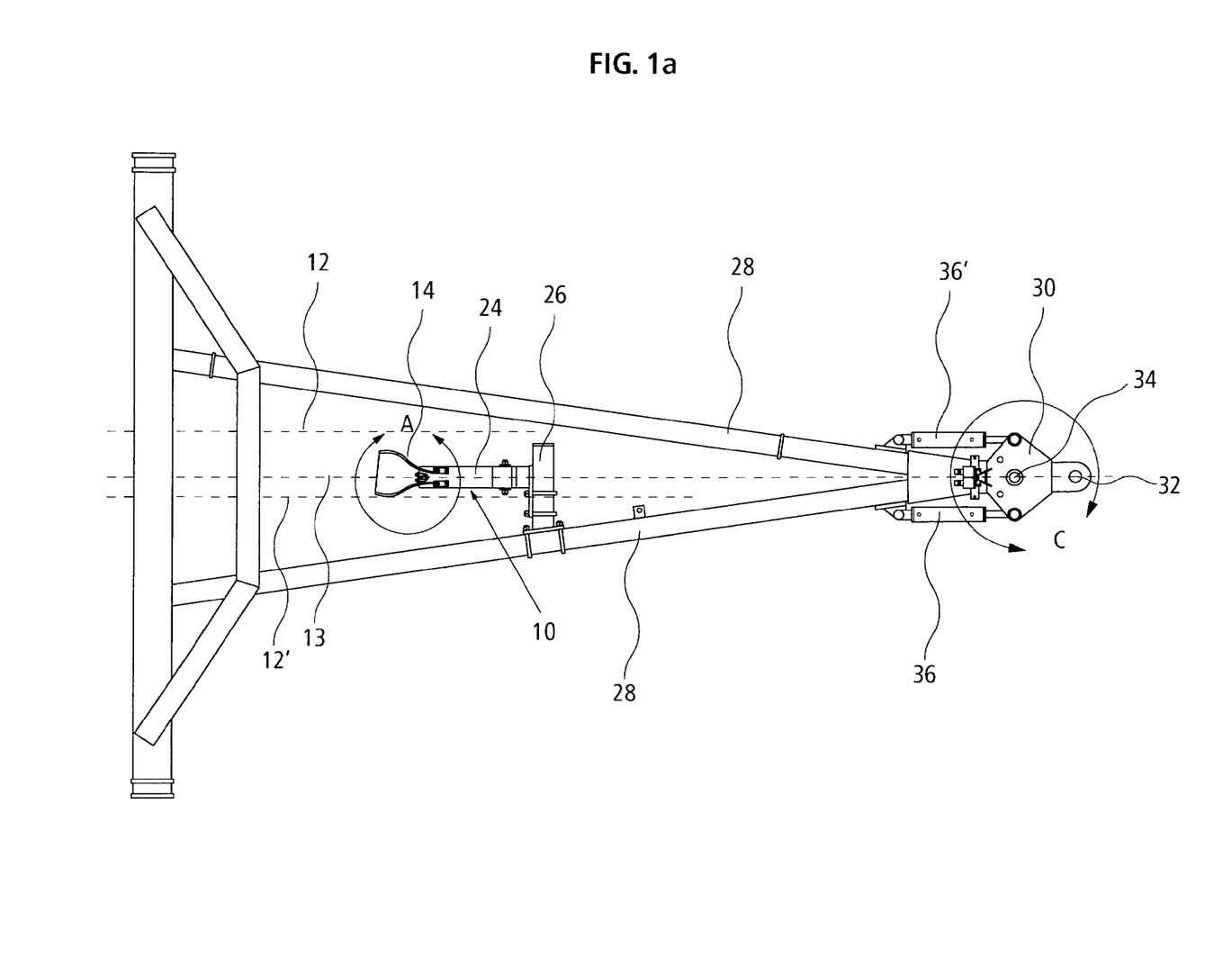
FIG. 1a is a top view of a hitch with an embodiment of the guidance system of the present invention attached thereto.

With reference first to FIGS. 1a to 1e, one embodiment of the present invention will be described. FIG. 1a is a top view of a guidance system 10 of the present invention that has been operably attached to hitch 28 of the towed implement (not shown). Hitch 28 is pivotally attached to the distal end of hitch plate 30 by means of pivot pin 34. The proximal end of hitch plate 30, in turn, is attached to a towing vehicle such as a tractor (not shown) by means of hitch pin 32.

The guidance system 10 comprises sensor means 14. As can be seen more clearly in the expanded top view of sensor means 14 in FIG. 1b, in this embodiment sensor means 14 is shaped like a paddle having a wider end 18 and a narrower tapered end 20. The narrow end 20 of sensor means 14 is pivotally attached to sensor mount arm 24 by means of pivot pin 21. Sensor mount arm 24 is mounted to hitch 28 of the towed implement by means of hitch mount arm 26 such that sensor mount arm extends downwardly from hitch 28 towards the ground and sensor means 14 extends from sensor mount arm 24 so as to be substantially parallel to the ground. This can be seen more clearly in FIG. 1e, a side view of the sensor means 14 mounted on hitch 28. FIG. 1e shows the sensor means 14 mounted substantially parallel to and raised a few inches above ground 31. Height adjustment bolt 29 allows for sensor mount arm 24 to be raised or lowered, depending on crop or stubble being sensed. Routinely, sensor means will be between about 3 to about 12 inches off the ground.

Figure 1B:
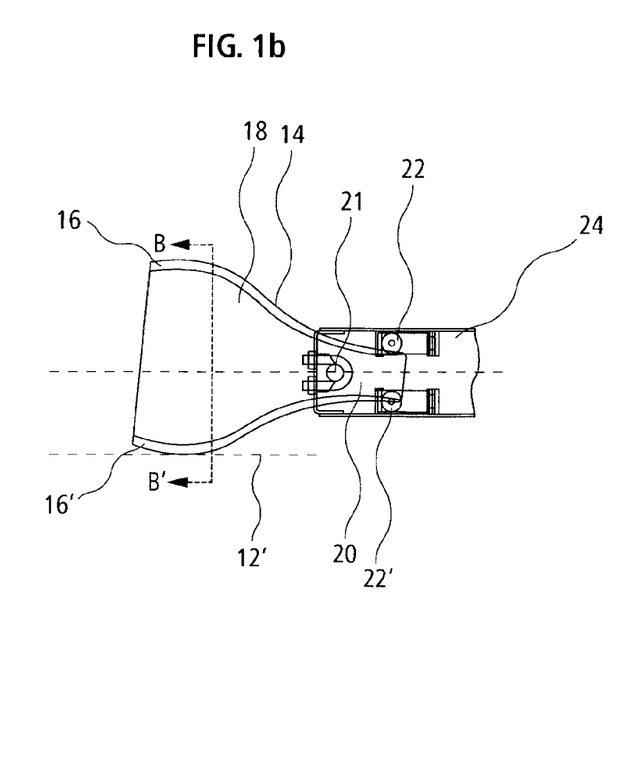
FIG. 1b is an enlarged top view of an embodiment of the sensor means, which is shown contacting a row of growing crops or standing stubble, and an embodiment of the sensing means for sensing said contact.

As can be seen in the expanded view of sensor means 14 in FIG. 1b, sensor means 14 has left and right edges, 16 and 16', respectively, which edges sense the rows of growing crops or standing stubble. As shown in FIGS. 1a and 1b, the sensor means is positioned between left and right rows of crop or stubble, 12 and 12', respectively. However, as shown in FIG. 1a, there may be times when the towed implement and hitch 28 are not centered, i.e., in this instance, path 13 is slightly to the right of center. Because of the misaligned path of the towed implement and hitch 28, as shown in FIG. 1a, the right edge 16' of sensor means 14 is now touching right row 12'. Thus, a force is now being applied to right edge 16', which force causes the sensor means 14 to pivot towards the left. The pivotal movement of sensor means 14 (either to the right or left) causes the narrow tapered end 20 of sensor means 14 to activate one or the other of steering sensor switches 22, 22'. In the instance shown in FIGS. 1a and 1b, narrow tapered end 20 is activating steering sensor switch 22'.

When turned on, steering sensor switches 22, 22' will provide an electrical signal to a corresponding hydraulic solenoid valve, which valve in turn causes the release of hydraulic fluid to one or the other of a pair of hydraulic cylinders 36, 36'. The hydraulic cylinders 36, 36' are connected at one end to hitch plate 30 and at the other end to hitch 28, such that when one or the other of the hydraulic cylinders is activated the hitch plate 30 will pivotally rotate either to the right or the left, thereby causing the towed implement and hitch 28 to laterally move to the right or left and hence centering the senor means 14 in between the rows of growing crop or standing stubble once again.

Figure 2:
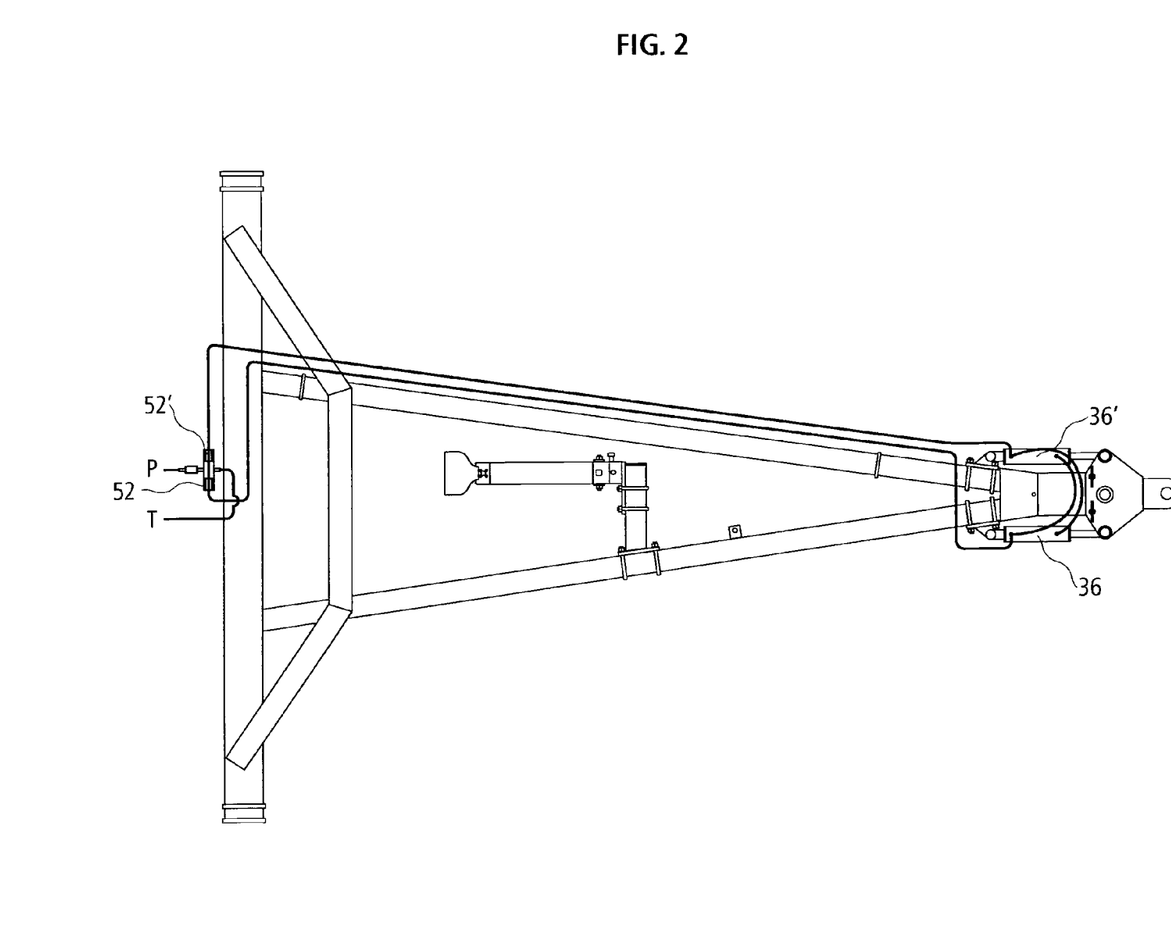
FIG. 2 shows the hydraulics of an embodiment of the guidance system and centering system of the present invention.
Figure 3:
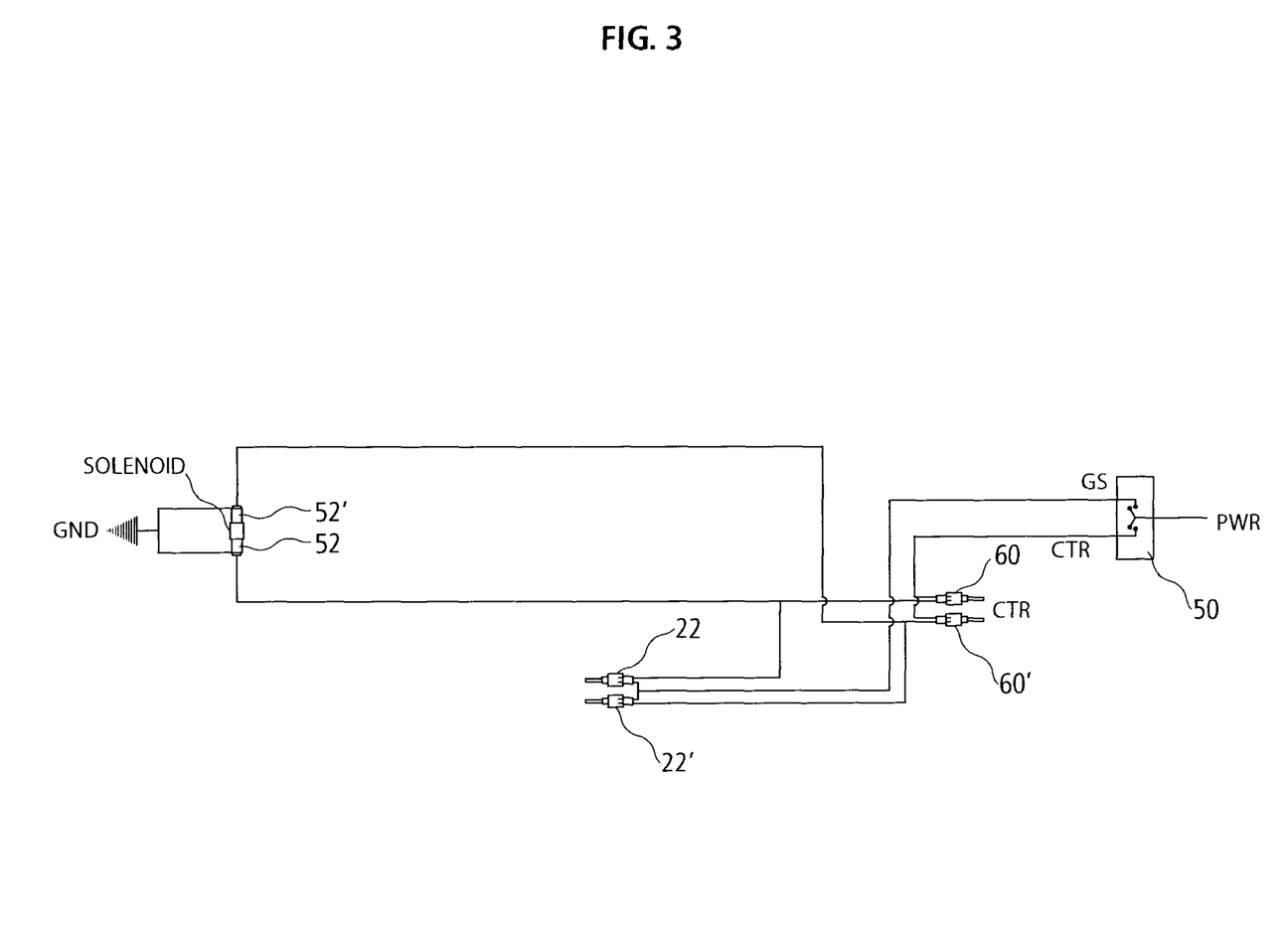
FIG. 3 shows the electrical circuitry of an embodiment of the guidance system and centering system of the present invention.

The hydraulics and the electrical circuitry of the present invention are shown in more detail in FIGS. 2 and 3, respectively. As can be seen in FIG. 3, control box 50, which is preferably situated in the cab of the towing vehicle, supplies power to the guidance system when the guidance system (GS) switch is switched on. When either steering sensor switches 22, 22' of the guidance system are subsequently switched on, which will occur when the sensor means is off-center, the turned-on steering sensor switch will send an electrical current to respective hydraulic solenoid valves 52, 52'. With reference now to FIG. 2, when either hydraulic solenoid valve 52, 52' is activated, it will send hydraulic fluid to corresponding hydraulic cylinder 36, 36'.

The operation of the hydraulics and electrical system will be further described using the example shown in FIGS. 1a to 1b. In FIGS. 1a and 1b, the narrower tapered end 20 of sensor means 14 is being pushed into steering sensor switch 22' as a result of the force being applied to right edge 16' by the crop or stubble row 12', which force allows the senor means 14 to pivot about pivot pin 21. The force applied to steering sensor switch 22' turns on the steering sensor switch 22', which then sends an electrical signal (current) to hydraulic solenoid valve 52'. Hydraulic solenoid valve 52' effects the release of hydraulic fluid to hydraulic cylinder 36', which cylinder expands so that the hitch plate 30 pivots or rotates to the left and in turn towed implement and hitch 28 moves to the left until there no longer is any force being applied to either left edge 16 or right edge 16'. It is understood that a pneumatic solenoid valve system coupled with pneumatic cylinders could also be used.

Figure 1C:
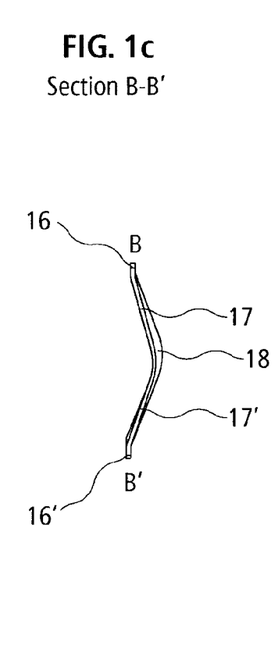
FIG. 1c is a cross-section along lines B-B of the embodiment of the sensor means shown in FIG. 1b.

FIG. 1c is the cross section of the wider end 18 of sensor means 14 along line B-B as shown in FIG. 1b. In this embodiment, a portion of the wider section 18 is concave or bow-shaped to facilitate the guidance of the sensor means off the top of a row of crops or stubble in the event sensor means 14 wanders on top of same. As can be seen in FIG. 1c, sensor means 14 further comprises left sloped surface 17 and right sloped surface 17'. Under normal operating conditions, left and right edges 16, 16' are sufficient to guide the sensor means 14 and hence the tools of the towed implement between the rows. However, if sensor means 14 wanders onto the top of a row, a force will be applied to either left sloped surface 17 or right sloped surface 17' when either of these surfaces contacts the row. These forces will also cause the sensor means to pivot either to the right or the left around pivot point 21, thereby causing the narrower tapered end 20 of sensor means 14 to be pushed into either steering sensor switch 22 or 22' and ultimately activating the corresponding hydraulic cylinder. Thus, the guidance system will be activated and the sensor means 14 will ultimately be move to the left or right allowing it to slide off the crop or stubble row. It is understood, however, that the sensor means being concave is a preferred feature and that a substantially planar sensor means will also successfully guide the tools of a towed implement between the rows.

Figure 1D:
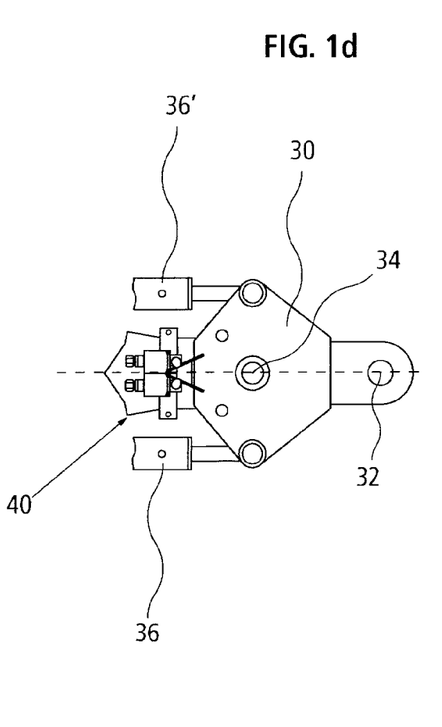
FIG. 1d is an enlarged top view of an embodiment of the hitch plate with the hydraulic cylinders attached thereto.
Figure 1E:
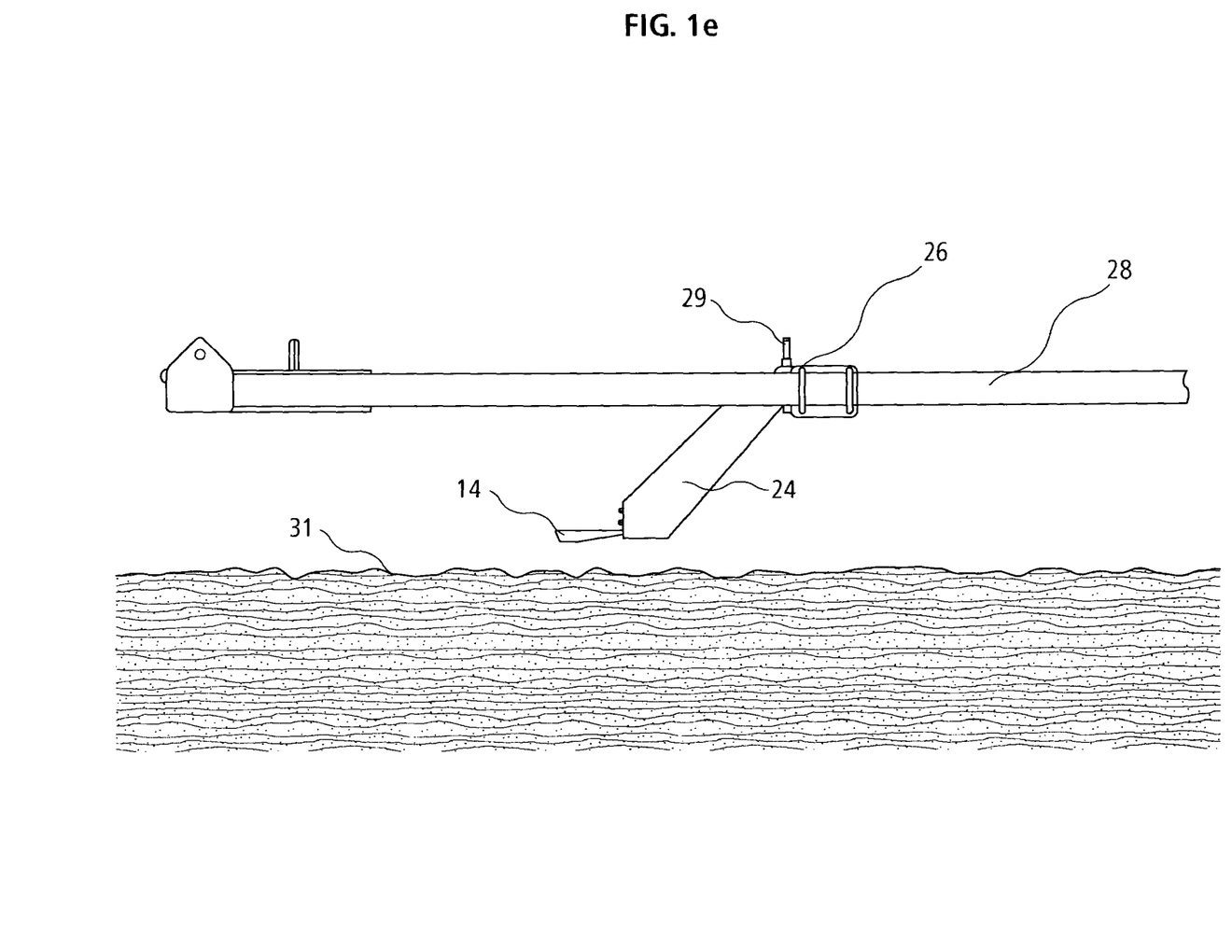
FIG. 1e is a side view of an embodiment of the sensor means and sensor mounting arm which mounts the sensor means to the hitch of the towed implement such that the sensor means does not contact the ground.

FIG. 1d is an expanded view of a portion of hitch 28 and hitch plate 30. Hitch 28 further comprises a centering system 40, which will be described in more detail with reference now to FIGS. 4a and 4b. There are instances where it may be advantageous for an operator to be able to center the towed implement relative to the work vehicle by a separate system from the guidance system. For example, there may be times where the towed implement encounters an area where the crops or stubble have been trampled or where there is a patch of weeds and it may be necessary to re-center the towed implement relative to the work vehicle and starting the guidance system once again. Hence, the guidance system of the present invention may further comprise centering system 40. Thus, the operator has the option of overriding the guidance system by switching off the GS switch and instead switching on the CTR (centering) switch, which is also found in control box 50 (see FIG. 3). Now, the electrical current is being supplied to centering system 40 instead of guidance system 10.

Figure 4A:
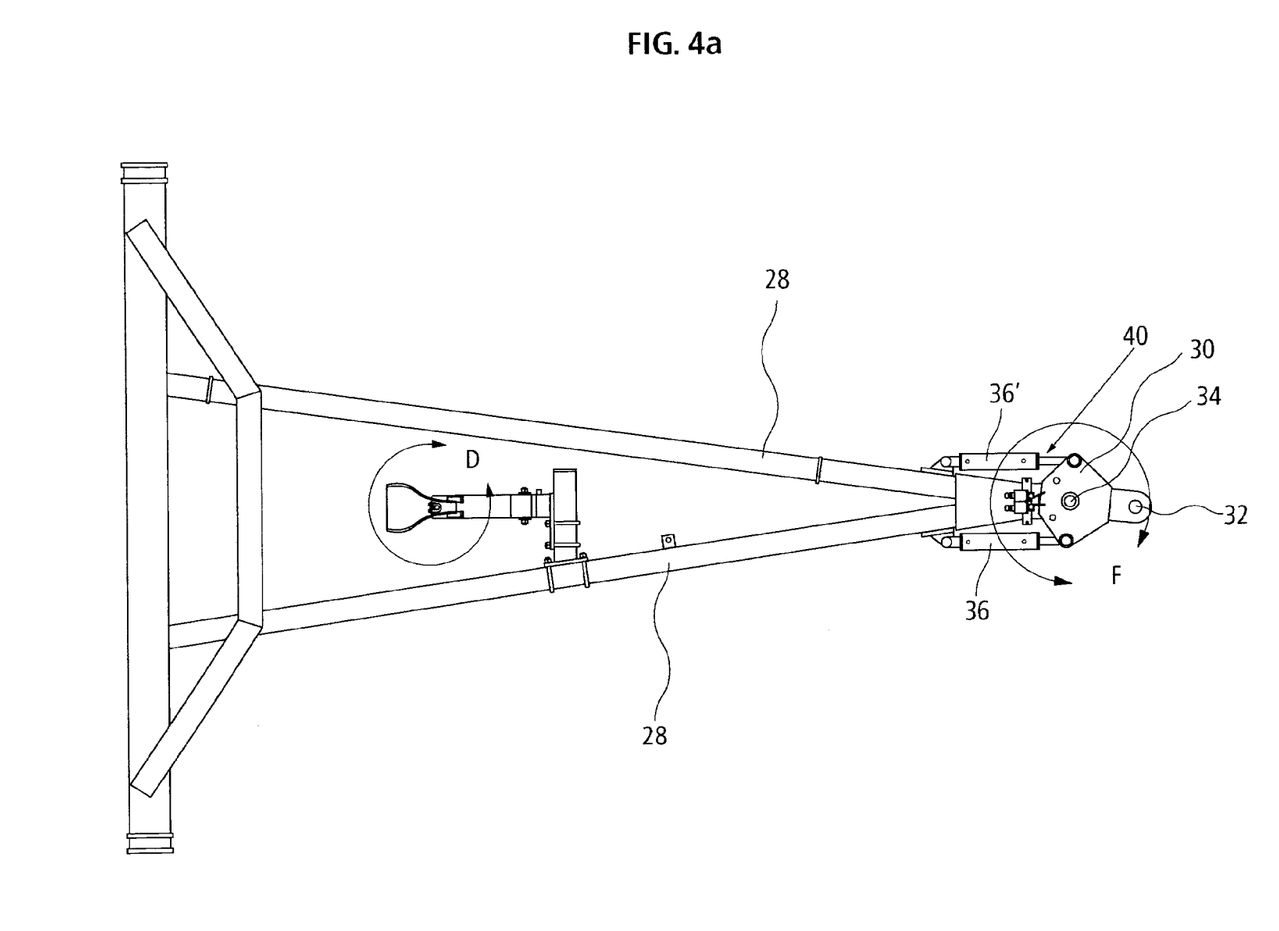
FIG. 4a is a top view of a hitch with an embodiment of the centering system of the present invention attached thereto.
Figure 4B:
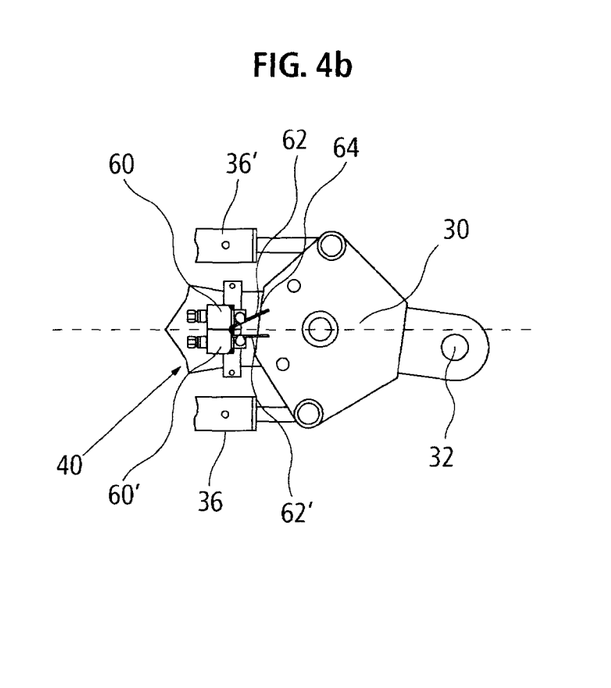
FIG. 4b is an enlarged top view of the hitch plate and centering system.
Figure 4C:
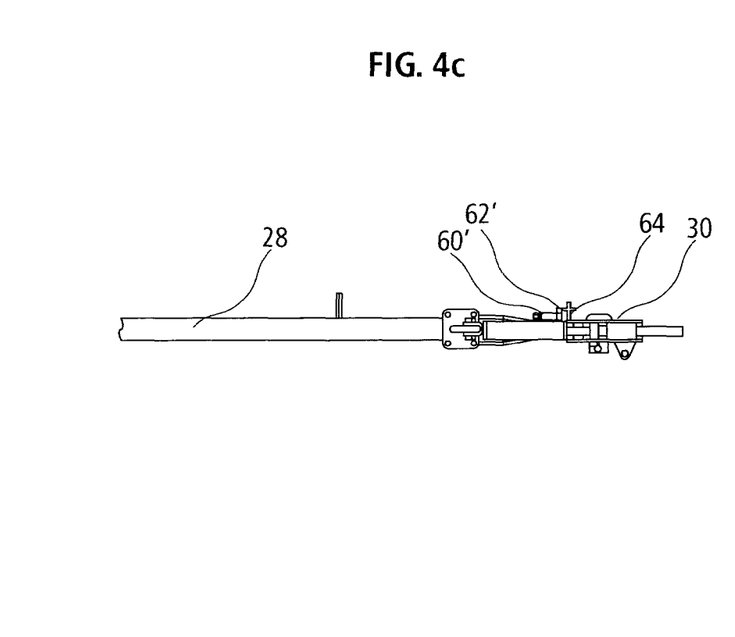
FIG. 4c is a side view of an embodiment of the centering system.

FIGS. 4a to 4c illustrates centering system 40, which operates to align the towed implement with the work vehicle by aligning pivot point 34 with pivot point 32. As previously mentioned, there may be situations where the sensor means of the guidance system is no longer sensing the rows of crops or stubble. Thus, it may be desirable for the operator to turn off the guidance system and turn on the centering system and center or align the towed implement relative to the work vehicle and start all over again.

Centering system 40 is positioned on hitch 28 so as to be operably associated with hitch plate 30 as follows. Centering system 40 comprises a pair of centering electric switches 60, 60', each having corresponding activating levers 62, 62'. Hitch plate 30 comprises flat bar 64, which is welded on to hitch plate 30 so that it extends upwardly between activating levers 62, 62'. This is seen most clearly in FIG. 4c. Thus, when the center line of the towed implement is not aligned with the center line of hitch 30, flat bar 64 will exert a force on either activating levers 62, 62', depending upon whether the towed implement is off center to the left or right of the center line of the hitch. For example, as shown in FIGS. 4a and 4b, hydraulic cylinder 36' is extended so that hitch plate 30 is pivoted to the left. Thus, in order to center the towed implement, hydraulic cylinder 36 must be activated to pivotally rotate the hitch plate 30 to the right.

Hydraulic cylinder 36 is activated as follows. Because hitch plate 30 is pivotally rotated to the left, this causes flat bar 64 to exert a force onto activating lever 62, as shown in FIGS. 4a and 4b. Activating lever 62 in turn activates centering electric switch 60. With reference to FIG. 3, it can be seen that when centering electric switch 60 is switched on it sends an electrical signal to hydraulic solenoid valve 52. With reference now to FIG. 2, hydraulic solenoid valve 52 effects the release of hydraulic fluid to hydraulic cylinder 36, which cylinder expands so that the hitch plate 30 rotates to the right until there no longer is any force being applied to either activating levers 62, 62' by flat bar 64. At this time, the towed implement will be aligned with the work vehicle.

While the invention has been described in conjunction with the disclosed embodiments, it will be understood that the invention is not intended to be limited to these embodiments. On the contrary, the current protection is intended to cover alternatives, modifications and equivalents, which may be included within the spirit and scope of the invention. Various modifications will remain readily apparent to those skilled in the art.

We claim:

1. A guidance system for positioning an agricultural implement having a hitch and being towed by a work vehicle on a preferred path for operating between rows of growing crops or standing stalks or stubble, said hitch being pivotally attached to the distal end of a hitch plate and the work vehicle being pivotally attached to the proximal end of the hitch plate, comprising:
   (a) a sensor having a paddle-like shape, the sensor having a distal end wider than a proximal end, the distal end having a right edge and a left edge, the sensor being operably mounted on the implement such that the sensor is substantially parallel to, but does not engage, the ground;
   (b) a sensing device that senses when a force is being applied to one of the right edge or left edge of the sensor by one or the other of the rows and produces a corresponding signal; and
   (c) a signal receiver for receiving the signal and effecting the lateral rotation of the hitch plate in response to the signal, thereby causing the hitch and the towed implement to laterally move either to the right or left relative to the work vehicle.

2. The guidance system as claimed in claim 1, whereby the width of the distal end of the sensor at its widest point is less than the space between the rows.

3. The guidance system as claimed in claim 1, wherein the sensor is substantially solid and made from a plastic resin.

4. The guidance system as claimed in claim 1, wherein a portion of the distal end of the sensor is substantially concave having a right sloped surface and a left sloped surface, whereby when a force is applied to either sloped surface by one or the other of the rows, the force is sensed by the sensing device, thereby producing a corresponding signal to prevent the sensor from riding on top of one or the other of the rows.

5. The guidance system as claimed in claim 1, wherein the sensor is positioned about 3 to about 12 inches above the ground.

6. The guidance system as claimed in claim 1, wherein the sensing device comprises at least one steering sensor switch.

7. The guidance system as claimed in claim 1, wherein the sensing device comprises a pair of steering sensor switches.

8. The guidance system as claimed in claim 1, wherein the signal receiver comprises at least one hydraulic or pneumatic solenoid valve.

9. The guidance system as claimed in claim 1, wherein the signal receiver comprises a pair of hydraulic or pneumatic solenoid valves.

10. The guidance system as claimed in claim 8, wherein the signal receiver further comprises at least one hydraulic or pneumatic cylinder.

11. The guidance system as claimed in claim 9, wherein the signal receiver further comprises a pair of hydraulic or pneumatic cylinders.

12. The guidance system as claimed in claim 1, further comprising a centering system for overriding the guidance system to align the towed implement with the work vehicle when needed.

* * * * *